US010216315B2

(12) United States Patent
Dabic et al.

(10) Patent No.: US 10,216,315 B2
(45) Date of Patent: Feb. 26, 2019

(54) CONTROL DEVICE FOR A MOTOR VEHICLE AND CONTROL METHOD

(71) Applicant: DAV, Créteil (FR)

(72) Inventors: Stéphanie Dabic, Créteil (FR); Stéphane Vanhelle, Créteil (FR)

(73) Assignee: DAV, Créteil (FR)

(*) Notice: Subject to any disclaimer, the term of this patent is extended or adjusted under 35 U.S.C. 154(b) by 169 days.

(21) Appl. No.: 15/105,758

(22) PCT Filed: Dec. 18, 2014

(86) PCT No.: PCT/FR2014/000292
§ 371 (c)(1),
(2) Date: Jun. 17, 2016

(87) PCT Pub. No.: WO2015/092168
PCT Pub. Date: Jun. 25, 2015

(65) Prior Publication Data
US 2017/0024059 A1    Jan. 26, 2017

(30) Foreign Application Priority Data
Dec. 19, 2013    (FR) .................................. 13 03009

(51) Int. Cl.
*B60Q 9/00*    (2006.01)
*G06F 3/16*    (2006.01)
(Continued)

(52) U.S. Cl.
CPC ............ *G06F 3/0416* (2013.01); *B60K 35/00* (2013.01); *B60K 37/00* (2013.01); *B60Q 9/00* (2013.01);
(Continued)

(58) Field of Classification Search
None
See application file for complete search history.

(56) References Cited

U.S. PATENT DOCUMENTS

| 8,816,985 B1* | 8/2014 | Tate ........................ G06F 3/041 345/173 |
| 2006/0132456 A1* | 6/2006 | Anson ................... G06F 3/0488 345/173 |

(Continued)

FOREIGN PATENT DOCUMENTS

JP    2007-042004 A    2/2007

OTHER PUBLICATIONS

International Search Report issued in PCT/FR2014/000292 dated Mar. 11, 2015 (2 pages).

(Continued)

*Primary Examiner* — Matthew Yeung
(74) *Attorney, Agent, or Firm* — Osha Liang LLP

(57) ABSTRACT

The invention relates to a method for controlling a control device for a motor vehicle which comprises measuring the variation in the pressure by a user pressing on a touch-sensitive surface (2) and generating a haptic feedback, characterised in that the haptic feedback comprises at least one vibratory feedback when the variation in the pressing pressure (dp1, dp2, dp2') over a predetermined time (dt1, dt2) is within a predefined range, and in that the haptic feedback is replaced with a replacement acoustic feedback when the variation in the pressing pressure (dp1, dp2, dp2') over the predetermined time (dt1, dt2) leaves the predefined range.

9 Claims, 2 Drawing Sheets

(51) Int. Cl.
  *G06F 3/041* (2006.01)
  *B60K 37/00* (2006.01)
  *G06F 3/01* (2006.01)
  *B60K 35/00* (2006.01)

(52) U.S. Cl.
  CPC ............ *G06F 3/016* (2013.01); *G06F 3/0414* (2013.01); *G06F 3/16* (2013.01); *B60K 2350/1028* (2013.01); *B60K 2350/1032* (2013.01)

(56) References Cited

U.S. PATENT DOCUMENTS

| | | | |
|---|---|---|---|
| 2006/0181520 A1* | 8/2006 | Ikegawa | G06F 3/04886 345/173 |
| 2012/0032801 A1* | 2/2012 | Ujii | G06F 3/0488 340/540 |
| 2013/0063389 A1 | 3/2013 | Moore | |
| 2014/0176415 A1* | 6/2014 | Buuck | G06F 3/016 345/156 |

OTHER PUBLICATIONS

Written Opinion of the International Searching Authority issued in PCT/FR2014/000292 dated Mar. 11, 2015 (5 pages).

\* cited by examiner

CONTROL DEVICE FOR A MOTOR VEHICLE AND CONTROL METHOD

The present invention relates to a control device for an automotive vehicle and to a method for commanding said control device.

In the last few years, automobiles have become easier to drive with the appearance of new emerging technologies (for example power steering, ABS, cruise control, parking sensors, etc.). However, the number of functions to be controlled while driving has paradoxically also greatly increased. This may create a certain complexity relating to unfamiliarity with the use of these functionalities and their diversity. The automobile has become a veritable living space, perceived as an interconnected center of personal communication: with for example MP3 player and GPS functionalities and connection with cell phones.

The introduction of these new functions has led to an increase in the number of buttons on automobile passenger-compartment dashboards. However, the number of buttons cannot increase indefinitely, in particular because of the complexity engendered, space limitations, accessibility or cognitive load. In addition, the interaction of the driver with on-board systems in the automobile may create a situation of attentional overload in which the driver cannot optimally process all the information of the driving task, leading to mistakes and detection times that are too long.

One option is to centralize the buttons by replacing them with a touchscreen. This makes it possible to continue to increase the number of functions, the latter becoming programmable and reconfigurable and being displayed temporarily or permanently depending on the context or the activated function. The screen thus enables multifunctionality, while virtualizing the buttons and being personalizable. In addition, screens have three other major advantages: on the one hand they allow direct interaction (the display and input are co-located), on the other hand they are flexible (the display may easily be configured for a certain number of functions), and lastly they are intuitive (familiar methods of interaction, such as a pointer for example, may be used).

However, contrary to the case of a push button, when the driver interacts with a touchscreen he receives no feedback related directly to his action on the interface, other than the simple contact of his finger pressing against the screen.

In order to compensate for the loss of information caused by the substitution of conventional mechanical interfaces with touchscreens, provision is made to add a stimulus, such as a haptic stimulus, to provide feedback from the system to the user. This stimulus allows any ambiguity as to whether the action of the user has been registered by the system, and that is liable to be instrumental in the appearance of dangerous situations, to be avoided. However, it is furthermore necessary to avoid overloading the driver's visual and auditory pathways, which are already greatly taxed by the driving task. Specifically, the use of touchscreens in an automotive vehicle must not distract the driver.

One aim of the present invention is to provide a control device and a method for commanding said control device, which improves the stimulation of the user, without interfering with his driving, which is easily perceived and appreciated by the users, and which is able to be discriminated from other signals for a touchscreen application satisfying automotive constraints.

For this purpose, one subject of the present invention is a method for commanding a control device for an automotive vehicle, in which device the pressure variation of a press of a user on a touch surface is measured and a sensory stimulus is generated, characterized in that the sensory stimulus includes at least one vibratory stimulus when the variation in the press pressure over a predetermined duration is comprised in a predefined range and in that the sensory stimulus is replaced with a substitutional audio stimulus when the variation in the press pressure over the predetermined duration departs from the predefined range.

Specifically it has been observed that when the user very rapidly presses and/or releases the touch surface i.e. in such a way as to leave his finger pressed on the touch surface for less than 80 ms, perception of the vibratory stimulus may be hindered because of a loss of contact between the skin and the vibrating touch surface. Thus, the user may not perceive the delivered haptic signal since his finger loses contact at the moment of the generation of the vibration. In these situations, in which the press or the release is very quick, the substitutional audio stimulus makes it possible to simulate the perception got by contact with the vibration of the touch surface. The substitutional audio stimulus thus gives the user the impression of having felt a haptic stimulus.

According to one exemplary embodiment, the sensory stimulus includes a vibratory stimulus and an associated audio stimulus when the variation in the press pressure over a predetermined duration is comprised in a predefined range, i.e. for a sufficiently long press. The audio-haptic sensory stimulus is then replaced with a substitutional audio stimulus when the variation in the press pressure over the predetermined duration departs from the predefined range.

Provision is made for the frequency range of the substitutional audio stimulus to be distinct from the frequency range of the audio stimulus associated with the vibratory stimulus, thereby allowing the audio stimulus of a standard press, i.e. a press of sufficient length, to be distinguished from the substitutional audio stimulus simulating a haptic stimulus.

According to one exemplary embodiment, the frequency range of the substitutional audio stimulus is substantially the same as the frequency range of the vibratory stimulus. By preserving the frequency of the vibratory stimulus for the generation of the substitutional audio stimulus, the resemblance with a haptic stimulus is improved by mimicry of the sound memorized by the user for a vibratory stimulus. The substitutional audio stimulus thus makes it possible to simulate, via the auditory canal, the audio-haptic sensation equivalent to the audio-haptic sensory stimulus generated for a standard press.

According to one exemplary embodiment, the duration of the substitutional audio stimulus is substantially equal to the duration of the vibratory stimulus. By preserving the duration of the vibratory stimulus for the generation of the substitutional audio stimulus, the simulation of a haptic stimulus is improved by mimicry of the feeling memorized by the user for a vibratory stimulus.

According to one exemplary embodiment, the sensory stimulus includes at least one vibratory stimulus when the value of the variation in the press pressure over a predetermined duration is higher than or equal to a predefined threshold and the sensory stimulus is replaced with a substitutional audio stimulus when the value of the variation in the press pressure over the predetermined duration is smaller than the predefined threshold.

For example, the sensory stimulus is replaced with a substitutional audio stimulus when the press pressure decreases to zero in less than 80 ms. Specifically, below 80 ms, it becomes difficult for the control device to process the information and to deliver in response a haptic stimulus to the user over a residual duration allowing good contact perception conditions to be enjoyed by the user.

Another subject of the invention is a method for commanding a control device for an automotive vehicle, wherein
a first pressure variation of a press of a user on a touch surface is measured and a first sensory stimulus is generated;
then, when the measured press pressure ceases to increase and decreases, a second sensory stimulus is generated including at least one vibratory stimulus when the second press pressure variation over a second predetermined duration is comprised in a second predefined range, the second sensory stimulus being replaced with a second substitutional audio stimulus when the second press pressure variation over the second predetermined duration departs from the second predefined range.

Another subject of the invention is a method for commanding a control device for an automotive vehicle, wherein
a first pressure variation of a press of a user on a touch surface is measured and a first sensory stimulus is generated including at least one vibratory stimulus when the first press pressure variation over a first predetermined duration is comprised in a first predefined range, the first sensory stimulus being replaced with a first substitutional audio stimulus when the first press pressure variation over the first predetermined duration departs from the first predefined range;
then, when the measured press pressure ceases to increase and decreases, a second sensory stimulus is generated.

Another subject of the invention is a method for commanding a control device for an automotive vehicle, wherein
a first pressure variation of a press of a user on a touch surface is measured and a first sensory stimulus is generated including at least one vibratory stimulus when the first press pressure variation over a first predetermined duration is comprised in a first predefined range, the first sensory stimulus being replaced with a first substitutional audio stimulus when the first press pressure variation over the first predetermined duration departs from the first predefined range;
then, when the measured press pressure ceases to increase and decreases, a second sensory stimulus is generated including at least one vibratory stimulus when the second press pressure variation over a second predetermined duration is comprised in a second predefined range, the second sensory stimulus being replaced with a second substitutional audio stimulus when the second press pressure variation over the second predetermined duration departs from the second predefined range.

The first and second sensory stimuli thus allow the press and release of a push button to be simulated. The generation of the substitutional audio stimulus, when substituted for the first and/or second, vibratory or audio-haptic, sensory stimuli/stimulus, makes it possible, in the case where the measured pressure variation decreases too fast, indicating a very rapid press or release, to ensure that nonetheless the user has the impression of having felt a haptic stimulus.

Another subject of the invention is a control device for an automotive vehicle, including:
a touch surface including a contact sensor able to measure a press pressure on the touch surface; and
a sensory stimulus module configured to generate a sensory stimulus in response to a contact with the touch surface;
characterized in that the sensory stimulus module is configured to generate a sensory stimulus including at least one vibratory stimulus when the variation in the press pressure over a predetermined duration is comprised in a predefined range and to replace the sensory stimulus with a substitutional audio stimulus when the variation in the press pressure over the predetermined duration departs from the predefined range.

BRIEF DESCRIPTION OF THE DRAWINGS

Other advantages and features will become clear on reading the description of the invention, and from the appended figures which show an exemplary nonlimiting embodiment of the invention and in which.

In these figures, identical elements have been given the same reference numbers.

DETAILED DESCRIPTION

The expression "haptic" designates a stimulus of the sense of touch. Thus, the haptic stimulus is for example a vibration of the touch surface felt by contact with the touch surface. The expression "vibratory stimulus" or "vibration" designates the vibration of the touch surface allowing a haptic stimulus to be delivered to the user manipulating the touch surface i.e. via his sense of touch.

Figure 1:
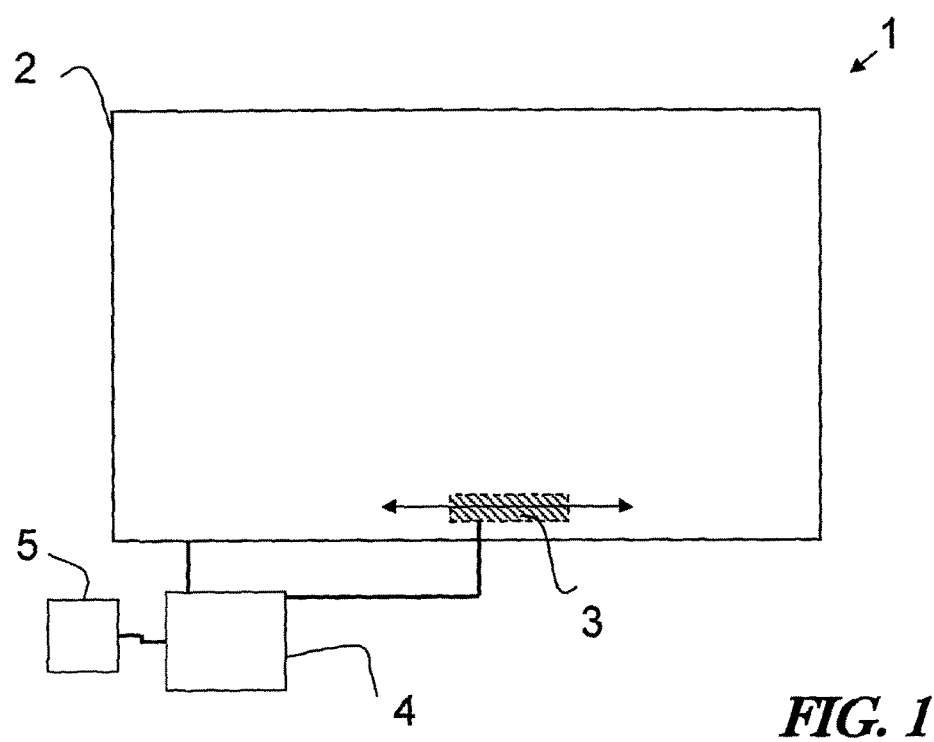
FIG. 1 shows an exemplary control device for an automotive vehicle.

FIG. 1 shows a control device for an automotive vehicle 1, for example arranged in a dashboard of the vehicle.

The control device 1 includes a touch surface 2 and a sensory stimulus module 4 configured to generate a sensory stimulus in response to a contact with the touch surface 2 by a finger or any other activating means (for example a stylus) of a user having for example modified or selected a command.

The touch surface 2 is for example a touchscreen. A touchscreen is an input periphery allowing users of a system to interact therewith through touch. It allows the user to interact directly with the zone that he wants to select for various purposes such as for example to select a destination address or a name in an address book, to adjust the air-conditioning system, to activate a dedicated function, to select a route from a list, or generally to scroll through a list of choices and to select, validate and correct a choice.

The touch surface 2 includes a panel bearing a contact sensor able to measure a press pressure on the touch surface during a predetermined duration.

The contact sensor is for example a pressure sensor, such as one using a force sensing resistor (FSR) technology, i.e. using pressure sensitive resistors. FSR technology is very resistant and robust while nonetheless having a high resolution. In addition, it is very reactive and precise, while being relatively stable over time. It may have a quite long lifetime, and is usable with any type of activating means, at relatively low cost.

In one FSR technology, the sensor functions by sensing when two conductive layers make contact, for example under the action of a finger. One embodiment consists in covering a glass plate with a layer of conductive ink, on which is superposed a flexible polyester sheet, itself covered on its internal face with a layer of conductive ink. Transparent insulating pads insulate the plate from the polyester sheet. An activation of the touch surface produces a slight depression in the polyester layer, which makes contact with the conductive layer of the glass plate. The local contact of the two conductive layers leads to a modification in the electrical current applied to the plate, corresponding to a voltage gradient.

According to another example, the contact sensor comprises flexible semiconductor layers sandwiched between, for example, a conductive layer and a resistive layer. By exerting a pressure or a swipe on the FSR layer, its ohmic resistance decreases thus allowing, by application of a suitable voltage, the applied pressure and/or the position of the location where the pressure is being exerted to be measured.

According to another example, the contact sensor is based on a capacitive technology.

The sensory stimulus module 4 is configured to generate a sensory stimulus including at least one vibratory stimulus when the variation in the press pressure over a predetermined duration is comprised in a predefined range and to replace the sensory stimulus with a substitutional audio stimulus when the variation in the press pressure over the predetermined duration departs from the predefined range.

The predetermined duration is for example shorter than 80 ms, such as about 50 ms.

Specifically it has been observed that when a user very rapidly presses and/or releases the touch surface 2 i.e. in such a way as to leave his finger pressed on the touch surface for less than 80 ms, perception of the vibratory stimulus may be hindered because of a loss of contact between the skin and the vibrating touch surface 2. Thus, the user may not perceive the delivered haptic signal since his finger loses contact at the moment of the generation of the vibration. In these situations, in which the press and/or the release is very quick, the substitutional audio stimulus makes it possible to simulate the perception got by contact with the vibration of the touch surface 2. The substitutional audio stimulus thus gives the user the impression of having felt a haptic stimulus.

The command method and the control device 1 may thus be used to simulate a very quick single press or the press and release of a push button or the manipulation of a rotary control knob or a slider for which the press and/or the release is too rapid to allow a haptic stimulus to be delivered under good perception conditions.

Thus, the sensory stimulus module 4 includes an audio emission unit 5 and at least one actuator 3 connected to the panel of the touch surface 2, in order to generate a vibration depending on a signal issued from the contact sensor. The vibration is for example directed in the plane of the touch surface 2 or orthogonally to the plane of the touch surface 2 or even directed in a combination of these two directions.

The vibration is produced by a sinusoidal command signal or by a command signal including a or a succession of pulses, sent to the actuator 3. In the case of a plurality of actuators, the latter are arranged under the touch surface 2, in various positions (at the center or on one side) or with various orientations (in the direction of the press on the surface or on another axis).

According to one exemplary embodiment, the actuator 3 is based on a technology similar to that of voice coils. It includes a fixed portion and a portion that is translatably movable in a gap of the fixed portion, for example by about 200 μm, between a first and second position, parallelly to a longitudinal axis of the movable portion. The movable portion is for example formed by a movable magnet sliding in the interior of a fixed coil or by a movable coil sliding around a fixed magnet, the movable portion and the fixed portion interacting electromagnetically. The movable portions are connected to the panel so that the movement of the movable portions engenders the translational movement of the panel in order to deliver the haptic stimulus to the finger of the user. This technology is easily controllable and allows large weights, such as that of a screen, to be moved at various frequencies and meets the very strict constraints of the automotive industry that are a lowcost, a good resistance to large temperature variations, and implementational simplicity.

According to one exemplary embodiment, the sensory stimulus only includes a vibratory stimulus when the variation in the press pressure over a predetermined duration is comprised in a predefined range, i.e. for a press of sufficient length. The vibratory stimulus is replaced with a substitutional audio stimulus when the variation in the press pressure over the predetermined duration departs from the predefined range.

According to another exemplary embodiment, the sensory stimulus includes a vibratory stimulus and an associated audio stimulus when the variation in the press pressure over a predetermined duration is comprised in a predefined range. The audio-haptic sensory stimulus is then replaced with a substitutional audio stimulus when the variation in the press pressure over the predetermined duration departs from the predefined range.

Provision is for example made for the frequency range of the substitutional audio stimulus to be distinct from the frequency range of the audio stimulus associated with the vibratory stimulus, thereby allowing the audio stimulus of a standard press, i.e. a press of sufficient length, to be distinguished from the substitutional audio stimulus simulating a haptic stimulus.

According to one exemplary embodiment, the frequency range of the substitutional audio stimulus is substantially the same as the frequency range of the vibratory stimulus and it is for example comprised between 60 and 200 Hz. By preserving the frequency of the vibratory stimulus for the generation of the substitutional audio stimulus, the resemblance with a haptic stimulus is improved by mimicry of the sound memorized by the user for the vibratory stimulus. The substitutional audio stimulus thus makes it possible to simulate, via the auditory canal, an audio-haptic sensation equivalent to the audio-haptic sensory stimulus generated for a standard press.

According to one exemplary embodiment, the duration of the substitutional audio stimulus is substantially equal to the duration of the vibratory stimulus. By preserving the duration of the vibratory stimulus for the generation of the substitutional audio stimulus, the simulation of a haptic stimulus is improved by mimicry of the feeling memorized by the user for a vibratory stimulus.

According to one exemplary embodiment, whether the sensory stimulus is replaced with a substitutional audio stimulus depends on a threshold of variation in the press pressure over the predetermined duration. For example, the sensory stimulus is replaced with a substitutional audio stimulus when the press pressure decreases to zero in less than 80 ms. Specifically, below 80 ms, it becomes difficult for the control device to process the information and to deliver in response a haptic stimulus to the user over a residual duration allowing good contact perception conditions to be enjoyed by the user.

It is also possible to provide for the sensory stimulus module 4 to be configured to evaluate the press pressure variation speed, and to replace the sensory stimulus with a substitutional audio stimulus depending on the press pressure variation speed profile, alternatively or in addition to the comparison with a press pressure variation threshold.

Equally, it is possible to provide for the sensory stimulus module 4 to be configured to evaluate the press pressure variation acceleration, and to replace the sensory stimulus with a substitutional audio stimulus depending on the press pressure variation acceleration profile, alternatively or in addition to the comparison with a press pressure variation speed and/or press pressure variation threshold.

Figure 2:
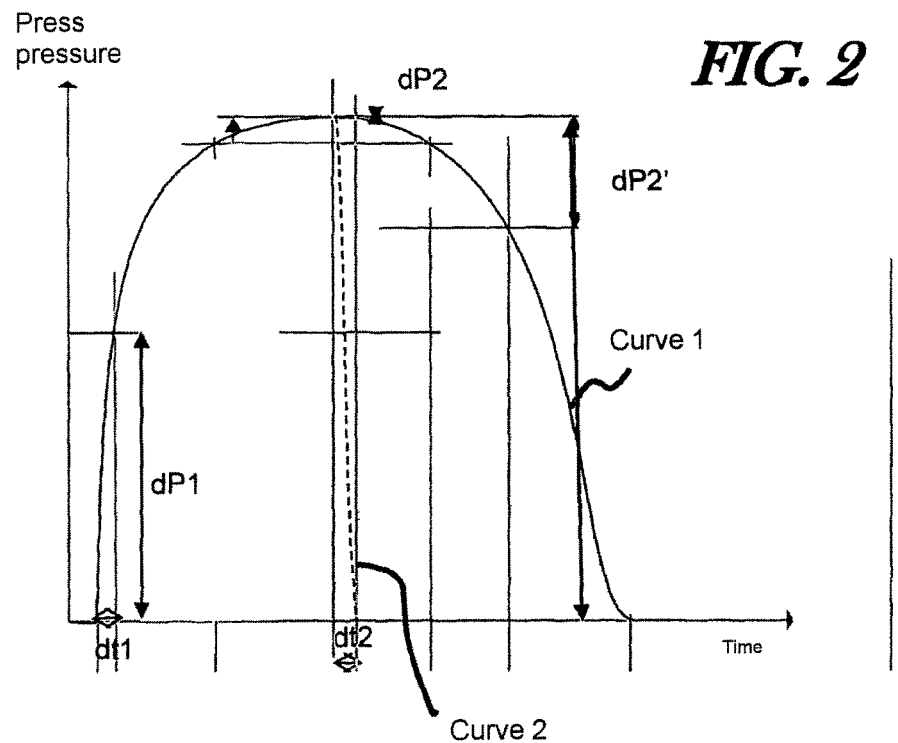
FIG. 2 shows a graph of the press pressure of a user on the touch surface as a function of time for a standard press (curve 1) and for a press having a very rapid release (curve 2)
Figure 3:
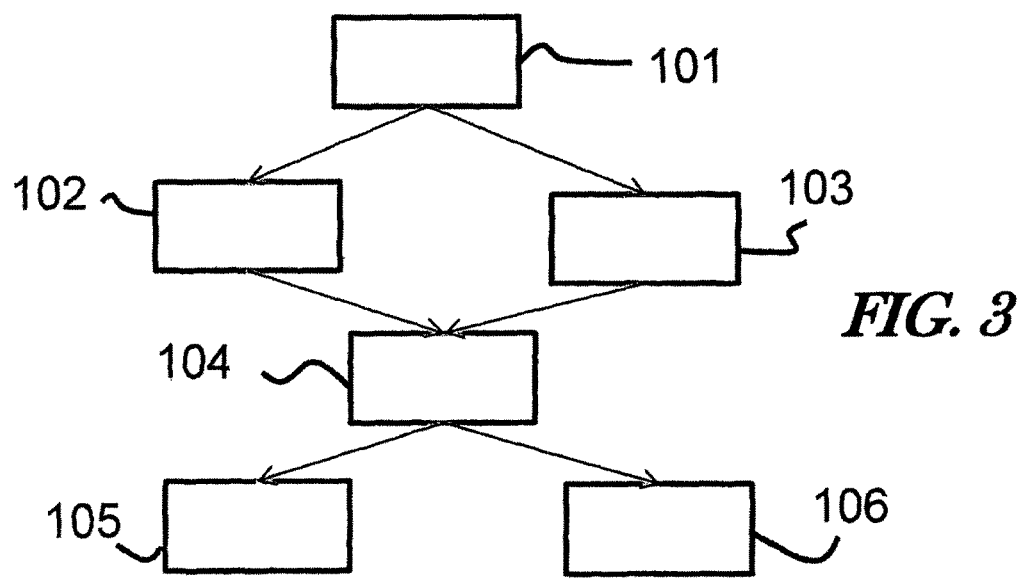
FIG. 3 illustrates an exemplary method for commanding a control device.

FIGS. 2 and 3 illustrate an exemplary embodiment of the method for commanding the control device simulating the "push and release" of a key type button.

In operation, the press pressure on the touch surface 2 is measured. When a press pressure variation becomes detectable, the press pressure is measured over a first predetermined duration dt1 (step 104), for example by taking the mean of the press pressure over the first predetermined duration dt1.

The first predetermined duration dt1 is for example about 80 milliseconds.

If the first press pressure variation dpi over the first predetermined duration dt1 is comprised in a first predefined range, then a first sensory stimulus is generated including at least one vibratory stimulus (step 105).

In contrast, if the first press pressure variation dp1 over the first predetermined duration dt1 departs from the first predefined range then the first sensory stimulus is replaced with a first substitutional audio stimulus (step 106).

For example, the sensory stimulus including a vibration is replaced with a substitutional audio stimulus when the press pressure decreases to zero in less than 80 ms.

Next, when the measured press pressure ceases to increase and decreases, the press pressure is measured over a second predetermined duration dt2 (step 101), for example of same length as the first predetermined duration dt1.

If the second press pressure variation dp2 over the second predetermined duration dt2 is comprised in a second predefined range, then a second sensory stimulus including at least one vibratory stimulus is generated (step 102).

In contrast, if the second press pressure variation dp2' over the second predetermined duration dt2 departs from the second predefined range then the second sensory stimulus is replaced with a second substitutional audio stimulus (step 103).

FIG. 2 thus shows an example in which the press pressure variation dp2 is small during the second predetermined duration, meaning that the release is accomplished slowly, allowing a haptic stimulus that will be felt by the finger of the user to be generated (curve 1). The case has also been illustrated in which the press pressure variation dp2' despite being very large has indeed decreased to zero at the end of the second predetermined duration dt2, meaning that the release is accomplished too rapidly to allow the sensory stimulus module 4 to generate a vibratory stimulus that would be perceived under good contact perception conditions by the user (curve 2).

The first and second sensory stimuli thus allow the press and release of a push button to be simulated. The generation of the substitutional audio stimulus, when substituted for the first and/or second, vibratory or audio-haptic, sensory stimuli/stimulus, makes it possible, in the case where the measured pressure variation decreases too fast, indicating a very rapid press or release, to ensure that nonetheless the user has the impression of having felt a haptic stimulus.

The invention claimed is:

1. A method for commanding a control device for an automotive vehicle, comprising:
    measuring the pressure variation of a press of a user on a touch surface of the control device; and
    generating a sensory stimulus in response to the measurement,
    wherein the press pressure variation is an average value of the press pressure over a predetermined duration,
    wherein the sensory stimulus includes at least one vibratory stimulus when the variation in the press pressure over the predetermined duration is comprised in a predefined range,
    wherein the sensory stimulus is replaced with a substitutional audio stimulus when the variation in the press pressure over the predetermined duration departs from the predefined range,
    wherein the sensory stimulus includes a vibratory stimulus and an associated audio stimulus when the variation in the press pressure over a predetermined duration is comprised in a predefined range and the sensory stimulus including a vibratory stimulus and an associated audio stimulus is replaced with a substitutional audio stimulus when the variation in the press pressure over the predetermined duration departs from the predefined range, and
    wherein the frequency range of the substitutional audio stimulus is the same as the frequency range of the vibratory stimulus.

2. The command method as claimed in claim 1, wherein the frequency range of the substitutional audio stimulus is distinct from the frequency range of the audio stimulus associated with the vibratory stimulus.

3. The command method as claimed in claim 1, wherein the duration of the substitutional audio stimulus is equal to the duration of the vibratory stimulus.

4. The command method as claimed in claim 1, wherein the sensory stimulus includes at least one vibratory stimulus when the value of the variation in the press pressure over a predetermined duration is higher than or equal to a predefined threshold and in that the sensory stimulus is replaced with a substitutional audio stimulus when the value of the variation in the press pressure over the predetermined duration is smaller than the predefined threshold.

5. The command method as claimed in claim 4, wherein the sensory stimulus is replaced with a substitutional audio stimulus when the press pressure decreases to zero in less than 80 ms.

6. A method for commanding a control device for an automotive vehicle, comprising:
    measuring a first pressure variation of a press of a user on a touch surface and a first sensory stimulus is generated; and
    wherein the first press pressure variation is an average value of the press pressure over a first predetermined duration,
    then, when the measured press pressure ceases to increase and decreases, generating a second sensory stimulus including at least one vibratory stimulus when a second press pressure variation comprising an average value of the press pressure over a second predetermined duration is comprised in a predefined range,
    the second sensory stimulus being replaced with a second substitutional audio stimulus when the second press pressure variation over the second predetermined duration departs from the predefined range, wherein the frequency range of the second substitutional audio stimulus are the same as the frequency range of the at least one vibratory stimulus.

7. A method for commanding a control device for an automotive vehicle, wherein
a first pressure variation of a press of a user on a touch surface is measured and a first sensory stimulus is generated including at least one vibratory stimulus when the first press pressure variation over a first predetermined duration is comprised in a first predefined range, the first sensory stimulus being replaced with a first substitutional audio stimulus when the first press pressure variation over the first predetermined duration departs from the first predefined range; and
wherein the first press pressure variation is an average value of the press pressure over a first predetermined duration,
then, when the measured press pressure ceases to increase and decreases, a second sensory stimulus is generated,
wherein the frequency range of the first substitutional audio stimulus is the same as the frequency range of the at least one vibratory stimulus.

8. A method for commanding a control device for an automotive vehicle, wherein
a first pressure variation of a press of a user on a touch surface is measured and a first sensory stimulus is generated including at least one vibratory stimulus when the first press pressure variation over a first predetermined duration is comprised in a first predefined range, the first sensory stimulus being replaced with a first substitutional audio stimulus when the first press pressure variation over the first predetermined duration departs from the first predefined range; and
wherein the first press pressure variation is an average value of the press pressure over a first predetermined duration,
then, when the measured press pressure ceases to increase and decreases, a second sensory stimulus is generated including at least one vibratory stimulus when the second press pressure variation over a second predetermined duration is comprised in a second predefined range, the second sensory stimulus being replaced with a second substitutional audio stimulus when the second press pressure variation over the second predetermined duration departs from the second predefined range,
wherein the second press pressure variation is an average value of the press pressure over a second predetermined duration,
wherein the frequency range of the first substitutional audio stimulus and the second substitutional audio stimulus are the same as the frequency range of the at least one vibratory stimulus.

9. A control device for an automotive vehicle, including:
a touch surface including a contact sensor able to measure a press pressure on the touch surface; and
a sensory stimulus module configured to generate a sensory stimulus in response to a contact with the touch surface; and
wherein the sensory stimulus module is configured to generate a sensory stimulus including at least one vibratory stimulus when the average value of the press pressure over a predetermined duration is comprised in a predefined range and to replace the sensory stimulus with a substitutional audio stimulus when the variation in the press pressure over the predetermined duration departs from the predefined range,
wherein the sensory stimulus includes a vibratory stimulus and an associated audio stimulus when the variation in the press pressure over a predetermined duration is comprised in a predefined range and the sensory stimulus including a vibratory stimulus and an associated audio stimulus is replaced with a substitutional audio stimulus when the variation in the press pressure over the predetermined duration departs from the predefined range, and
wherein the frequency range of the substitutional audio stimulus is the same as the frequency range of the vibratory stimulus.

* * * * *